No. 664,532. Patented Dec. 25, 1900.
W. L. CHURCH.
SEWAGE DISPOSAL APPARATUS.
(Application filed Dec. 7, 1899.)

(No Model.) 2 Sheets—Sheet 1.

WITNESSES: INVENTOR
W. L. Church
BY
ATTORNEYS.

No. 664,532. Patented Dec. 25, 1900.
W. L. CHURCH.
SEWAGE DISPOSAL APPARATUS.
(Application filed Dec. 7, 1899.)
(No Model.) 2 Sheets—Sheet 2.

WITNESSES:
INVENTOR
W. L. Church
BY
ATTORNEYS.

UNITED STATES PATENT OFFICE.

WILLIAM L. CHURCH, OF NEW YORK, N. Y.

SEWAGE-DISPOSAL APPARATUS.

SPECIFICATION forming part of Letters Patent No. 664,532, dated December 25, 1900.

Application filed December 7, 1899. Serial No. 739,467. (No model.)

*To all whom it may concern:*

Be it known that I, WILLIAM L. CHURCH, of New York, in the county of New York and State of New York, have invented certain new and useful Improvements in Sewage-Disposal Apparatus, of which the following is a specification.

It is a well-settled principle that sewage can be purified by allowing it to fill a bed of porous material and then subside therein, the subsidence drawing sufficient air into the bed to energize the bacteria, that are the purifying agents. In practice the beds are numerous, large in area, and deep, so that the time consumed in filling and subsiding is very considerable and the resulting plant is costly and slow in operation. I have found that very frequent applications in very small doses with short and frequent intervening periods of aeration very greatly increase the efficiency of the beds or filters and render any considerable depth of porous material unnecessary.

The object of this invention is to produce a practical and efficient apparatus operating on the principle above indicated; and to this end the invention consists in the improvements now to be described in detail in the following specification, fully illustrated upon the accompanying drawings, and set forth with particularity in the appended claims.

It is not primarily intended that my invention hereinafter described shall be applied to the reduction of raw sewage, although no limit is set up in this respect, but that it shall principally be used in treating an effluent from a preceding process in which the solid matter has been removed, said effluent containing mainly the organic matter remaining in or brought into solution.

Figure 1:
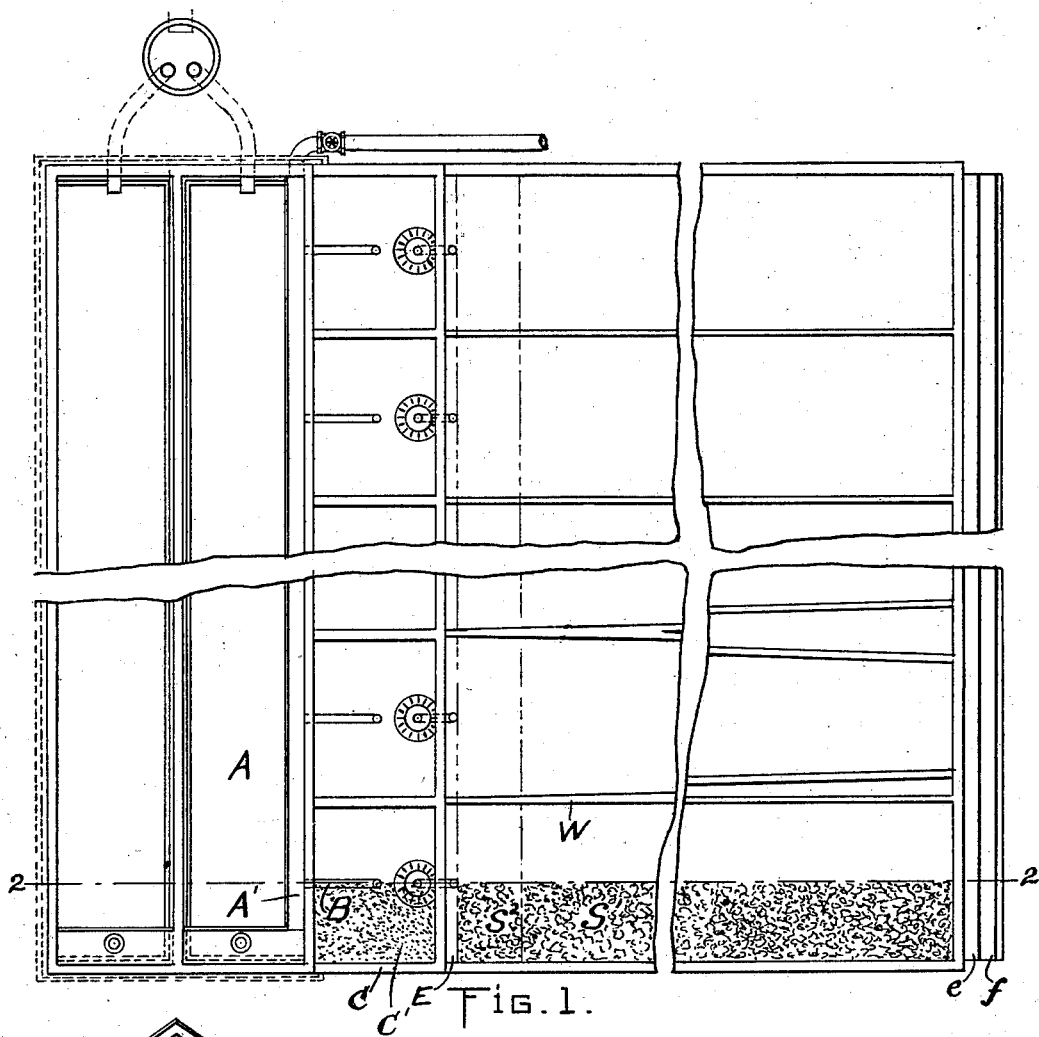
Figure 2:
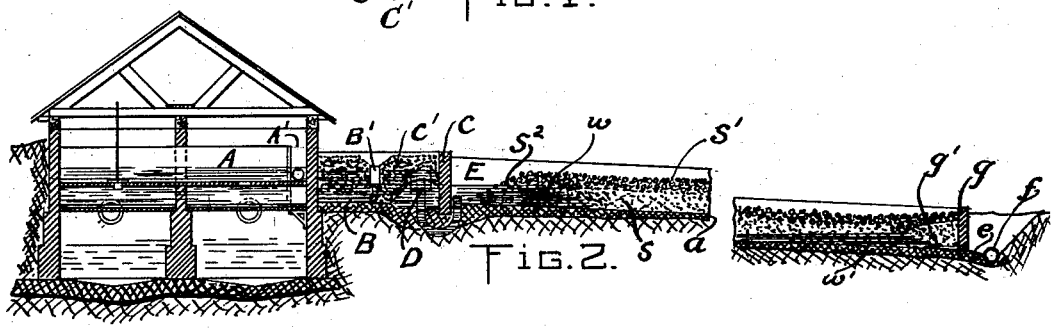
Figure 3:
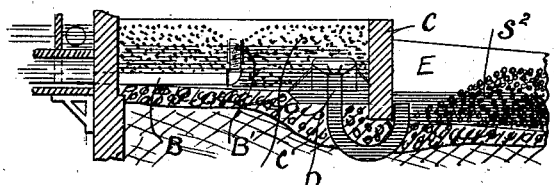
Figure 4:
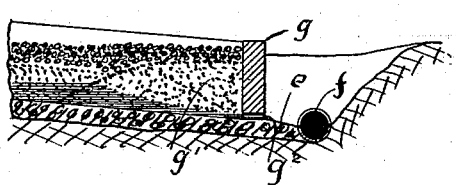
Figure 5:
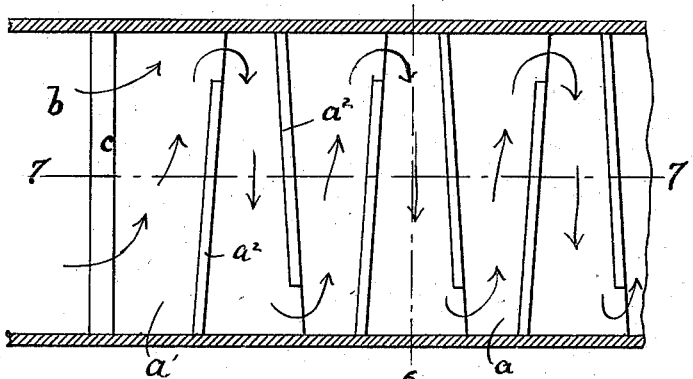
Figure 6:
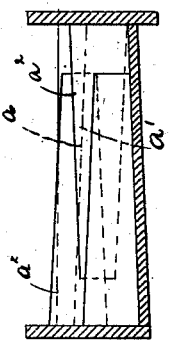
Figure 7:
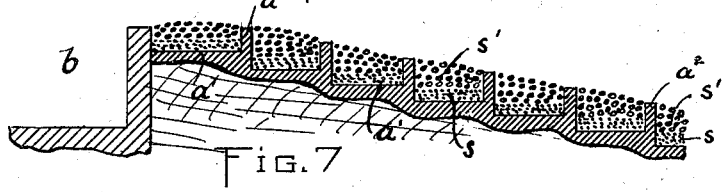
Figure 8:
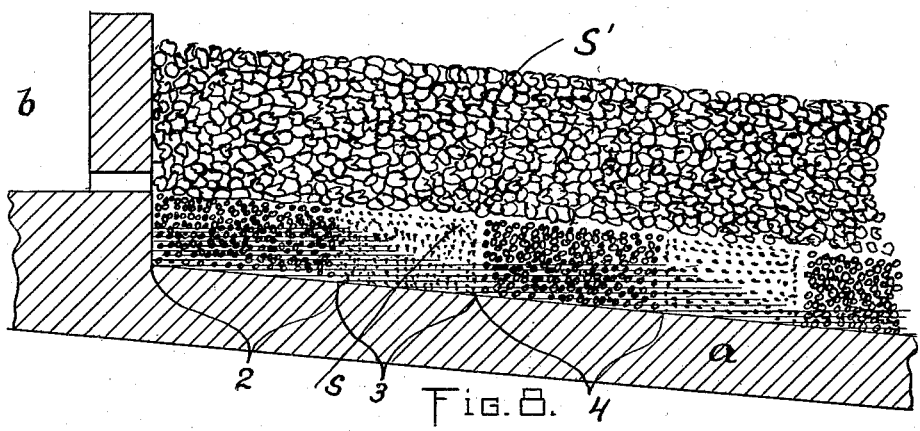

Of the accompanying drawings, on which like reference characters indicate like parts or features, as the case may be, wherever they occur, Figure 1 is a plan view of a sewage-disposal apparatus embodying my invention and comprising a series of apron-filters. Fig. 2 represents a section on line 2 2 of Fig. 1. Figs. 3 and 4 represent sectional views of portions of the apparatus on a larger scale and showing additional features. Fig. 5 represents a plan view of a portion of an apron-filter embodying my invention, but differing in certain particulars, hereinafter described, from the construction shown in the preceding figures. Fig. 6 represents a section on line 6 6 of Fig. 5. Fig. 7 represents a section on line 7 7 of Fig. 5. Fig. 8 represents a view showing certain refinements of the construction shown in Fig. 3.

In the drawings, $a$ is an inclined apron, of concrete, which supports an inclined porous bed, hereinafter described, the inclination of the apron and bed being exaggerated in the drawings for clearness. I have shown said apron in Fig. 2 as below the level of the ground. In practice it may be one hundred feet, more or less, in length, the length depending on the degree of purification required. Means are provided at the head of the apron for causing an intermittent flow of the impure water into the porous bed, the flow of water being periodically interrupted, so that each discharge flows down the porous bed in the form of a wave, which alternately rises and subsides in any given transverse section of the porous bed.

In the embodiment of my invention here shown the porous bed comprises a layer $s$ twelve inches deep (more or less) of material such as pea-coke, or it may be of broken stone or other suitable material in fragments of about the size of ordinary pea-coke. The layer $s$ rests on the apron $a$, which preferably has a slightly-rough surface, such as that afforded by ordinary concrete. On the top of the layer $s$ is a layer $s'$ six inches deep (more or less) of coarse broken stone, slag, pebble, or other suitable material.

The means here shown for periodically delivering the impure water to the bed are as follows: A represents a staling or septic tank into which the entire volume of sewage is admitted, said tank having suitable provisions for separating from the liquid delivered to the porous bed both the lighter floating matter and the heavier parts of the sewage, the former floating on the surface of the accumulation in the tank and the latter being deposited by gravitation at the bottom of the tank and both being ultimately liquefied in the tank by bacterial action, so that all the matter received by the tank is in time sufficiently liquefied for passage through and treatment in the porous inclined bed, as hereinafter described.

A trough or channel A' is connected with the tank A in such manner as to receive liquid therefrom at a point or points below the surface and above the bottom, so that the floating matter and the relatively heavy matter do not enter the trough A', the latter receiving the intermediate impure liquid. From the trough A' the liquid passes through a pipe B into a flush-tank C, which is somewhat higher than the head of the porous bed $s$ and contains a body C' of pea-coke or other suitable porous material. The flush-tank has for its outlet a flushing-siphon D of ordinary construction, the shorter leg of which discharges into a head-bay E at the higher end of the inclined porous bed. As here shown, one side of the head-bay is the outer wall of the flush-tank C, the opposite side being an abruptly-inclined extension $s^2$ of the covering-layer $s'$ of the porous bed $s$, said extension $s^2$ covering the upper end of the porous bed and serving to prevent the washing away or displacement of the material of the porous bed by the rush of liquid from the siphon. The flushing-siphon D discharges the contents of the flush-tank intermittently in the usual manner, and the head-bay E is of restricted capacity to receive the discharge, which thereby momentarily rises in the head-bay and subsequently flows therefrom through the porous outer wall $s^2$ into the porous bed $s$ in the form of a wave.

I do not limit myself to the flush-tank and its flushing-siphon as the means for periodically interrupting and renewing the flow at short intervals, but prefer the same as the simplest and most convenient and effectual means of which I am aware.

At the foot of the apron $a$ is a gutter $e$, connecting with an effluent-sewer $f$. Between the said gutter and the lower end of the porous bed $s$ is a foot-wall $g$, which supports a retarding filter-bank $g'$, of sand, coke-breeze, or other suitable material, interposed between the foot-wall and the lower end of the porous bed $s$. The liquid passes through the retarding-bank $g'$ and through an opening $g^2$ in the retaining-wall on its way to the gutter $e$.

The office of the covering of broken stone is threefold—namely, to hold the porous bed in place, to afford shade from direct sunlight to the bacteria in the bed $s$, (a most vital point, as sunlight is fatal to most orders of bacteria,) and to afford a degree of protection in the winter. The sewage being always warm and the fermentive action of the bacteria being itself a source of heat-supply, a body of stone will serve to partially retain this heat, while at the same time admitting a free supply of air to energize the nitrifying agents.

Effluent is fed to the apron in small doses, the flow of which, being checked by the resistance of the bed $s$, piles up in the head-bay E to form a wave in the porous body of the bed, the wave being indicated by the shaded portion $w$. The supply being quickly cut off, the wave will travel slowly down through the bed $s$, gradually flattening out till it meets the filter-bank $g'$, when it is again checked, rising to form a pool $w'$, which filters away through $g'$ and at last escapes into the gutter underneath the foot-wall $g$. The waves are made to follow each other at frequent and efficient intervals, so that as to any given transverse cross-section of the bed the effect is the ideal rise and subsidence in shallow beds at frequent and short intervals. Each subsidence draws in air and each rise expels the exhausted indraft last taken. It is obvious that these waves and the consequently respiratory action may be made to follow at very short intervals, as conditions may determine. The thickness of the porous bed $s$, the fineness of its material, the length and inclination of the apron $a$, the volume or capacity of the head-bay, and the rate of discharge of the siphon are all adjustable factors which may be made to determine the rate of traverse and height of the wave to the utmost nicety. In like manner the length of the wave and its period of recurrence are accurately under the control of the means for periodically interrupting and renewing the flow. It will also be seen that the liquid alternately rises and falls in the porous bed in the flush-tank C, the liquid falling with each discharge and rising when the discharge is interrupted. There is therefore a respiratory action in the said porous bed which contributes to the initial purification of the liquid passing through the tank.

The pipe B, which delivers the liquid to the flush-tank, is bent upwardly within the flush-tank and has a vertically-adjustable end section or sleeve B', having a screw-thread connection with the body of the pipe, so that it may be raised or lowered to vary the height of the delivering end of the pipe. This provision is made to enable a series of flush-tanks to be assembled, as shown in Fig. 2, and supplying a corresponding series of inclined porous beds to be filled in a uniform time.

If it is desirable to increase the time of traverse of the wave from one end of the bed to the other, this may be accomplished by causing the liquid to take a sinuous course, as shown in Fig. 5. To this end the apron instead of being a simple inclined plane comprises a series of steps $a'$, which are horizontal lengthwise of the bed and are slightly inclined crosswise thereof. The flow walls or baffles $a^2$ $a^2$ extend alternately nearly across the width of the apron and direct the flow from side to side, as indicated by the arrows, the time of traverse and consequent subjection to bacterial action being thereby increased.

An organized apparatus embodying my invention will have a plurality of porous inclined beds separated from each other by partition-walls W. These walls may be made to converge and make the lower ends of the inclined beds narrower than the higher ends, as shown in Fig. 1, thus increasing the height of the wave flowing down each bed by decreasing its width, the wave action being thus intensified.

The construction shown in Fig. 8 is intended to somewhat intensify the wave action, especially near the head of the apron. The porous bed instead of being uniform is arranged in alternate lateral bands or sections of finer and coarser material. Thus the section 2 may be gravel or pea-coke, the section 3 coke-breeze, the section 4 gravel, like the section 2, and so on. The water flowing freely through the section 2 will quickly rise to a greater height in it when it meets the section 3 of greater resistance, and thus the vertical wave action will be somewhat increased. It is obvious that this intensified wave action would progressively diminish with each successive section, so that the sectional construction may terminate a short distance below the head of the apron, the remaining portion of the bed being of uniform construction.

The porous beds and the liquid-guiding apron supporting and holding them in place constitute a gravity-conduit the porous material of which retards the gravitating liquid, forming it into waves and subdividing the waves into numerous ramifications or small streams flowing through the voids between the fragments or small pieces of which the bed is composed, the waves being shaded or kept dark and prevented from losing their heat by the covering-bed $s'$, which, as stated, permits ventilation of the bed $s$.

The waves are substantially isolated from or independent of each other, the wave formed by each discharge receding from the head-bay before the next discharge.

Having thus explained the nature of the invention and described a way of constructing and using the same, though without attempting to set forth all the forms in which it may be made or all the modes of its use, what I claim, and desire to secure by Letters Patent, is—

1. A sewage-disposal apparatus comprising means for intermittently discharging or releasing liquid, and a gravity-conduit having provisions for forming the discharges into a series of ramified waves.

2. A sewage-disposal apparatus comprising means for intermittently discharging or releasing liquid, and a gravity-conduit having provisions for forming the discharges into a series of ramified and shaded waves.

3. A sewage-disposal apparatus comprising means for intermittently discharging or releasing liquid, a porous bed, and a liquid-guiding support or holder therefor, said bed and holder being arranged to receive the discharges and conduct the same in a series of gravitating ramified waves.

4. A sewage-disposal apparatus comprising an impervious supporting-apron, a porous bed thereon, means for discharging liquid intermittently upon the apron, and means for retarding the escape of liquid from the apron, whereby the liquid is caused to alternately rise and subside in the porous bed.

5. A sewage-disposal apparatus comprising an inclined apron, a porous retarding-bed thereon, means for admitting liquid intermittently to the upper portion of the said bed, and a shading, heat-retaining, and ventilating cover for said bed.

6. A sewage-disposal apparatus comprising an inclined apron, a porous retarding-bed thereon, means for admitting liquid intermittently to the upper portion of the said bed, and a covering-bed superimposed upon the retarding-bed and of coarser material than the latter.

7. A sewage-disposal apparatus comprising an inclined apron, a porous retarding-bed thereon, means for admitting liquid intermittently to the upper portion of the said bed, a foot-wall below the lower end of the bed, and a filtering-bank interposed between the bed and the foot-wall.

8. A sewage-disposal apparatus comprising an inclined apron, a porous retarding-bed thereon, a head-bay at the upper end of said bed having a porous wall through which liquid passes to the retarding-bed, and means for admitting liquid intermittently to the head-bay.

9. A sewage-disposal apparatus comprising an inclined apron, a porous retarding-bed thereon, a flushing-tank located at the higher end of the bed and having means for intermittently discharging liquid to the retarding-bed, and a body of filtering material contained in said tank, the liquid admitted to the tank being caused to alternately rise and subside in said filtering material.

10. A sewage-disposal apparatus comprising an inclined apron, a porous retarding-bed thereon, a flushing-tank, located at the higher end of the bed and having means for intermittently discharging liquid to the retarding-bed, and a supply-pipe entering the flushing-tank and having a vertically-adjustable end section.

11. A sewage-disposal apparatus comprising an inclined apron having provisions for conducting liquid in a sinuous course, and a porous bed on said apron.

12. A sewage-disposal apparatus comprising an apron having a series of laterally-extending oppositely-inclined steps, walls or baffles extending from the higher ends of the steps partly to their lower ends, and a porous bed on said steps.

13. A sewage-disposal apparatus comprising an inclined apron, a porous bed on said apron, and side walls extending lengthwise of the bed and converging from the higher to the lower end of the bed.

In testimony whereof I have affixed my signature in presence of two witnesses.

WM. L. CHURCH.

Witnesses:
  C. F. BROWN,
  H. L. ROBBINS.